(12) United States Patent
Ichikawa et al.

(10) Patent No.: US 8,341,940 B2
(45) Date of Patent: Jan. 1, 2013

(54) ADDITION-AMOUNT CONTROLLER FOR EXHAUST GAS PURIFYING AGENT AND EXHAUST EMISSION CONTROL SYSTEM

(75) Inventors: Ataru Ichikawa, Kariya (JP); Shigeki Daido, Nishio (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 956 days.

(21) Appl. No.: 12/146,871

(22) Filed: Jun. 26, 2008

(65) Prior Publication Data

US 2009/0000280 A1  Jan. 1, 2009

(30) Foreign Application Priority Data

Jun. 27, 2007 (JP) ................. 2007-168406

(51) Int. Cl.
*F01N 3/00* (2006.01)
*F01N 1/00* (2006.01)
*F01N 3/10* (2006.01)

(52) U.S. Cl. ............ 60/286; 60/295; 60/301; 60/324

(58) Field of Classification Search ........... 60/273–324
See application file for complete search history.

(56) References Cited

U.S. PATENT DOCUMENTS

| | | | |
|---|---|---|---|
| 4,757,683 A | 7/1988 | Kawanabe et al. | |
| 5,595,060 A | 1/1997 | Togai et al. | |
| 5,628,186 A | 5/1997 | Schmelz | |
| 6,082,102 A | 7/2000 | Wissler et al. | |
| 6,119,448 A | 9/2000 | Emmerling et al. | |
| 6,209,315 B1 | 4/2001 | Weigl | |
| 6,269,633 B1 * | 8/2001 | van Nieuwstadt et al. | 60/277 |
| 6,295,809 B1 * | 10/2001 | Hammerle et al. | 60/286 |
| 6,427,439 B1 * | 8/2002 | Xu et al. | 60/286 |
| 6,516,607 B1 | 2/2003 | Bruck et al. | |

(Continued)

FOREIGN PATENT DOCUMENTS

DE 197 43 337 1/1999

(Continued)

OTHER PUBLICATIONS

Office Action (40 pgs) dated Oct. 17, 2011 issued in U.S. Appl. No. 12/146,844.

(Continued)

*Primary Examiner* — Thomas Denion
*Assistant Examiner* — Anthony Ayala Delgado
(74) *Attorney, Agent, or Firm* — Nixon & Vanderhye P.C.

(57) ABSTRACT

In an addition-amount controller for an exhaust gas purifying agent to be used for an exhaust emission control system, a catalyst has properties of storing $NH_3$ and further decreasing the critical reaction temperature as an amount of $NH_3$ storage at the catalyst is increased. In the addition-amount controller, a present $NH_3$ storage amount that is a storage amount of $NH_3$ of the catalyst is detected at a detection time, the $NH_3$ storage amount of the catalyst is changed by controlling an addition amount by an addition valve, and the $NH_3$ storage amount of the catalyst is controlled to a target $NH_3$ storage amount based on the detected present $NH_3$ storage amount.

14 Claims, 4 Drawing Sheets

U.S. PATENT DOCUMENTS

| | | | |
|---|---|---|---|
| 6,637,196 B1 * | 10/2003 | Tost .............................. 60/286 |
| 6,737,033 B1 | 5/2004 | Hofmann et al. |
| 6,871,489 B2 * | 3/2005 | Tumati et al. ................ 60/285 |
| 6,959,540 B2 | 11/2005 | Itoh et al. |
| 7,086,222 B2 | 8/2006 | Itoh et al. |
| 7,086,223 B2 | 8/2006 | Itoh et al. |
| 7,272,924 B2 | 9/2007 | Itoh et al. |
| 7,690,193 B2 * | 4/2010 | Wickert et al. .............. 60/286 |
| 7,908,843 B2 | 3/2011 | Doumeki et al. |
| 8,161,730 B2 * | 4/2012 | Chi et al. ..................... 60/286 |
| 2002/0152745 A1 * | 10/2002 | Patchett et al. .............. 60/286 |
| 2003/0037542 A1 | 2/2003 | Xu et al. |
| 2003/0110761 A1 | 6/2003 | Minami |
| 2003/0182935 A1 * | 10/2003 | Kawai et al. ................. 60/286 |
| 2005/0005596 A1 | 1/2005 | Xu et al. |
| 2005/0103000 A1 * | 5/2005 | Nieuwstadt et al. ......... 60/286 |
| 2005/0262832 A1 | 12/2005 | Itoh et al. |
| 2006/0000202 A1 | 1/2006 | Ripper et al. |
| 2006/0272317 A1 * | 12/2006 | Brown et al. ................ 60/286 |
| 2007/0048204 A1 | 3/2007 | Mital |
| 2007/0160508 A1 | 7/2007 | Doumeki et al. |
| 2009/0000278 A1 | 1/2009 | Ichikawa et al. |
| 2009/0000279 A1 | 1/2009 | Ichikawa et al. |
| 2010/0047638 A1 | 2/2010 | Johannessen |
| 2010/0062296 A1 | 3/2010 | Johannessen |

FOREIGN PATENT DOCUMENTS

| | | |
|---|---|---|
| DE | 197 36 384 | 2/1999 |
| DE | 198 14 386 | 11/1999 |
| EP | 0 697 062 | 2/1996 |
| EP | 0 953 739 | 11/1999 |
| EP | 2 316 558 | 5/2011 |
| JP | 2000-220445 | 8/2000 |
| JP | 2001-27113 | 1/2001 |
| JP | 2003-286828 | 10/2003 |
| JP | 2003-293739 | 10/2003 |
| JP | 2005-127256 | 5/2005 |
| JP | 2005-240811 | 9/2005 |
| WO | 99/54601 | 10/1999 |

OTHER PUBLICATIONS

Office Action dated May 10, 2011 issued in related U.S. Appl. No. 12/146,844.

Official Action dated Apr. 7, 2011 issued co-pending U.S. Appl. No. 12/146,829 of Ichikawa et al, filed Jun. 26, 2008.

Office Action (7 pgs.) dated Sep. 20, 2011 issued in co-pending U.S. Appl. No. 12/146,829.

Opposition Statement Filed by Opponent with the GPTO (10 pgs.) dated Jan. 24, 2012 issued in corresponding German Patent Application No. 10 2008 002 327.2 with English-language translation thereof (10 pgs.).

Opponents letter dated Jan. 24, 2012 (1 pg.) issued in corresponding German Patent Application No. 10 2008 002 327.2 with English-language translation thereof (1 pg.).

"Activation Energy", excerpt from IUPAC Compendium of Chemical Technology, $2^{nd}$ Edition (1997).

I. Chorkendorff and J. W. Niemantsverdriet, "Concepts of Modern Catalysis and Kinetics", 2003, 5 pgs.

Office Action (26 pgs.) dated Feb. 15, 2012 issued in related U.S. Appl. No. 12/146,844.

Japanese Office Action dated Apr. 23, 2009, issued in corresponding Japanese Application No. 2007-168405, with English translation.

Japanese Office Action dated Apr. 23, 2009, issued in corresponding Japanese Application No. 2007-168406, with English translation.

Japanese Office Action dated Apr. 23, 2009, issued in corresponding Japanese Application No. 2007-168407, with English translation.

U.S. Appl. No. 12/146,829, Ataru Ichikawa et al., filed Jun. 26, 2008, (JP 2007-168405).

U.S. Appl. No. 12/146,844, Ataru Ichikawa et al., filed Jun. 26, 2008, (JP 2007-168407).

German Office Action dated May 11, 2010, issued in corresponding German Application No. 10 2008 002 327.2-13, with English translation.

* cited by examiner

ADDITION-AMOUNT CONTROLLER FOR EXHAUST GAS PURIFYING AGENT AND EXHAUST EMISSION CONTROL SYSTEM

CROSS REFERENCE TO RELATED APPLICATION

This application is based on Japanese Patent Application No. 2007-168406 filed on Jun. 27, 2007, the contents of which are incorporated herein by reference in its entirety.

FIELD OF THE INVENTION

The present invention relates to an addition-amount controller for an exhaust gas purifying agent, for controlling an amount of addition of $NH_3$ for purifying exhaust gas by reaction with $NO_x$ in the exhaust gas. The invention also relates to an exhaust emission control system e.g., a urea-SCR system, for purifying exhaust gas by an exhaust gas purifying reaction based on $NH_3$ on a catalyst.

BACKGROUND OF THE INVENTION

In recent years, urea-SCR (selective reduction) systems have been developed in electric power plants, various factories, vehicles, and the like. Particularly, in the field of vehicles (especially, a diesel engine vehicle), post treatment techniques of exhaust gas for purifying and reducing $NO_x$ (nitrogen oxides) in the exhaust gas are classified into two important trends, namely, the above-described urea-SCR system, and a $NO_x$ storage-reduction catalyst. The urea-SCR system is already put into practical use in large trucks, and known to have a high purification ratio of a maximum of about "90%". Presently, the general urea-SCR systems which are now studied for application to diesel engines are designed to reduce (purify) $NO_x$ in the exhaust gas by means of $NH_3$ (ammonia) generated from a urea $((NH_2)_2CO)$ aqueous solution (hereinafter referred to as a urea water).

Conventionally, the system disclosed in JP-A-2003-293739 is known as a specific example of such a urea-SCR system. This system mainly includes a catalyst for promoting a specific exhaust gas purifying reaction (reduction reaction of $NO_x$), an exhaust pipe for guiding the exhaust gas discharged from an exhaust gas generating source (for example, an internal combustion engine) to the catalyst, and a urea water addition valve disposed at a midway point of the exhaust pipe for injecting and adding the urea aqueous solution (additive) to the exhaust gas flowing in the exhaust pipe. The system with this arrangement is configured to inject and add the urea aqueous solution into the exhaust gas by the urea water addition valve, and to supply the urea aqueous solution to the catalyst on the downstream side together with the exhaust gas, using a flow of the exhaust gas. The urea aqueous solution thus supplied is hydrolyzed by exhaust gas heat or the like to generate $NH_3$ (ammonia), as represented by the following chemical equation: $(NH_2)_2CO+H_2O \rightarrow 2NH_3+CO_2$. This leads to a reduction reaction of $NO_x$ by the $NH_3$ on the catalyst, through which the exhaust gas is purified.

However, the catalyst used in such purification of the exhaust gas generally promotes the reduction reaction of $NO_x$ in a temperature range exceeding an activation temperature (critical reaction temperature) inherent to the catalyst, that is, a temperature range having the activation temperature as the lower limit. Thus, the system as disclosed in JP-A-2003-293739 cannot have a sufficient capacity of purifying the exhaust gas when the catalyst is at a low temperature below the activation temperature.

Most of general catalysts for purification of exhaust gas for use in, for example, a vehicle-mounted internal combustion engine or the like have the activation temperature of about "180° C.". In contrast, the temperature of the exhaust gas emitted from the internal combustion engine during idling is generally about "140 to 150° C.". Thus, when the internal combustion engine (engine) serving as the exhaust gas generating source starts to accelerate from the idling state, the sufficient exhaust gas purification capacity is not obtained even though the increase in amount of emission of $NO_x$ is predicted due to a high load operation. This may lead to deterioration of exhaust emission characteristics. The same kind of problem may also be posed at other times, including startup of the engine.

SUMMARY OF THE INVENTION

The present invention has been made in view of the forgoing facts, and it is an object of the invention to provide an addition-amount controller for an exhaust gas purifying agent, which can obtain a high exhaust gas purification capacity in response to more conditions, and an exhaust emission control system which can exhibit the high exhaust gas purification capacity by using the addition-amount controller.

According to the present invention, an addition-amount controller for an exhaust gas purifying agent may be applied to an exhaust emission control system that includes a catalyst for promoting a specific exhaust gas purification reaction in a temperature range having a critical reaction temperature as a lower limit, and an addition valve for adding an additive of $NH_3$ (ammonia) or an additive serving as a generating source of the $NH_3$ to the catalyst itself or the exhaust gas on an upstream side with respect to the catalyst. The additive is adapted to purify $NO_x$ (nitrogen oxides) in exhaust gas by the exhaust gas purification reaction on the catalyst, and the addition-amount controller is adapted to control an amount of addition by the addition valve. Here, the catalyst has properties of storing $NH_3$ and further decreasing the critical reaction temperature as the amount of $NH_3$ storage is increased. According to an aspect of the present invention, the addition-amount controller includes: storage amount detection means for detecting a present $NH_3$ storage amount that is a storage amount of $NH_3$ of the catalyst at a detection time; storage amount changing means for changing the $NH_3$ storage amount of the catalyst by controlling the addition amount by the addition valve; and storage amount control means for controlling the storage amount changing means so as to control the $NH_3$ storage amount of the catalyst to a target $NH_3$ storage amount, based on the present $NH_3$ storage amount detected by the storage amount detection means.

It is known that the general catalyst for purification of the exhaust gas used in a vehicle-mounted internal combustion engine or the like stores $NH_3$ therein. The inventors of the present application take into consideration the fact that the catalyst has such a property that as the amount of storage of $NH_3$ becomes larger the activation temperature (critical reaction temperature) of the catalyst is decreased. According to above aspect of the present invention, the storage amount detection means can detect the storage amount of $NH_3$ stored on the catalyst, and the storage amount control means can control the $NH_3$ storage amount of the catalyst to the target $NH_3$ storage amount by changing the $NH_3$ storage amount. Accordingly, it is also possible to further decrease the activation temperature (critical reaction temperature) when the catalyst temperature is low, for example, in a case where the engine starts to accelerate from the idling state, thereby obtaining the higher exhaust gas purification capacity.

For example, the addition-amount controller may further include limit storage amount detection means for detecting a limit $NH_3$ storage amount that is able to be stored in the catalyst based on the temperature of the catalyst or a value equivalent to the temperature of the catalyst, and setting means for setting a variable range of the target $NH_3$ storage amount using the limit $NH_3$ storage amount detected by the limit storage amount detection means as an upper limit.

Supply of the $NH_3$ to the catalyst in an amount exceeding the limit $NH_3$ storage amount may lead to the deterioration of the emission characteristics. In this regard, setting of the limit $NH_3$ storage amount as the upper limit value can prevent (or reduce) the excess supply of $NH_3$. Generally, the higher the temperature of the catalyst is, the less the limit $NH_3$ storage amount is.

In the present invention, the limit storage amount detection means may be adapted to detect the limit $NH_3$ storage amount as the value equivalent to the temperature of the catalyst, based on a temperature of exhaust gas on a downstream side with respect to the catalyst.

Alternatively, the storage amount control means may be adapted to control the $NH_3$ storage amount of the catalyst to the target $NH_3$ storage amount by covering a shortfall of the $NH_3$ storage amount corresponding to a difference between the target $NH_3$ storage amount and the present $NH_3$ storage amount by the storage amount changing means. Furthermore, the storage amount control means may repeatedly execute the control of the $NH_3$ storage amount while a predetermined condition is satisfied.

Alternatively, the addition-amount controller may further include mode selection means for selecting one mode to be executed based on satisfaction of an execution condition for each mode, from among a plurality of control modes. For example, the control modes include a purification control mode in which the addition amount by the addition valve is determined according to a predetermined parameter associated with an amount of $NO_x$ in the exhaust gas, and a storage control mode in which the addition amount by the addition valve is set to be larger than that in the purification control mode. In this case, the storage amount control means may be adapted to execute the control of the $NH_3$ storage amount when the storage control mode is selected by the mode selection means.

Alternatively, the addition-amount controller may further include storage amount determination means for determining whether the $NH_3$ storage amount of the catalyst is larger than a predetermined amount. In this case, a satisfaction requirement of an execution condition of the storage control mode includes determination, by the storage amount determination means, that the $NH_3$ storage amount of the catalyst is not larger than the predetermined amount.

Alternatively, the addition-amount controller may further include limit storage determination means for determining whether $NH_3$ is able to be stored in the catalyst. In this case, the satisfaction requirement of an execution condition of the storage control mode includes determination, by the limit storage determination means, that $NH_3$ is able to be stored.

Alternatively, the addition-amount controller may further include catalyst temperature determination means for determining whether the temperature of the catalyst is lower than a predetermined temperature. In this case, the satisfaction requirement of the execution condition of the storage control mode includes determination, by the catalyst temperature determination means, that the temperature of the catalyst is lower than the predetermined temperature.

For example, the addition-amount controller may be used for an exhaust emission control system that is adapted to purify the exhaust gas emitted from an internal combustion engine. In this case, the storage amount detection means may determine an amount of increase or decrease in the $NH_3$ storage amount of the catalyst of each time based on a difference between the $NH_3$ amount supplied to the catalyst and an amount of consumption of $NH_3$ on the catalyst, while subsequently summing the amounts of increase or decrease of the respective times, so as to detect the present $NH_3$ storage amount. The addition-amount controller may further include means for determining the amount of consumption of $NH_3$ on the catalyst based on a predetermined parameter associated with an operating condition of the internal combustion engine, or means for determining the target $NH_3$ storage amount based on a boundary value at which the critical reaction temperature is not decreased even by increasing the $NH_3$ storage amount of the catalyst.

The addition valve may be adapted to inject and add a urea aqueous solution as the additive to the exhaust gas on an upstream side with respect to the catalyst. In this case, the urea aqueous solution is injected and added to the exhaust gas on the upstream side with respect to the catalyst, so that the urea is hydrolyzed by exhaust gas heat or the like until the urea reaches the catalyst to form $NH_3$. This can supply more $NH_3$ (purifying agent) to the catalyst.

BRIEF DESCRIPTION OF THE DRAWINGS

Additional objects and advantages of the present invention will be more readily apparent from the following detailed description of preferred embodiments when taken together with the accompanying drawings. In which.

DETAILED DESCRIPTION OF THE PREFERRED EMBODIMENTS

An addition-amount controller for an exhaust gas purifying agent and an exhaust emission control system according to one embodiment of the invention will be described below with reference to the accompanying drawings. The exhaust emission control system of this embodiment has the basic structure used in a general urea-SCR (selective reduction) system, as an example. With the structure shown in FIG. 1, $NH_3$ (ammonia) generated from a urea (($NH_2$)$_2$CO) aqueous solution (hereinafter referred to as a urea water) reduces (purifies) $NO_x$ in exhaust gas.

Figure 1:
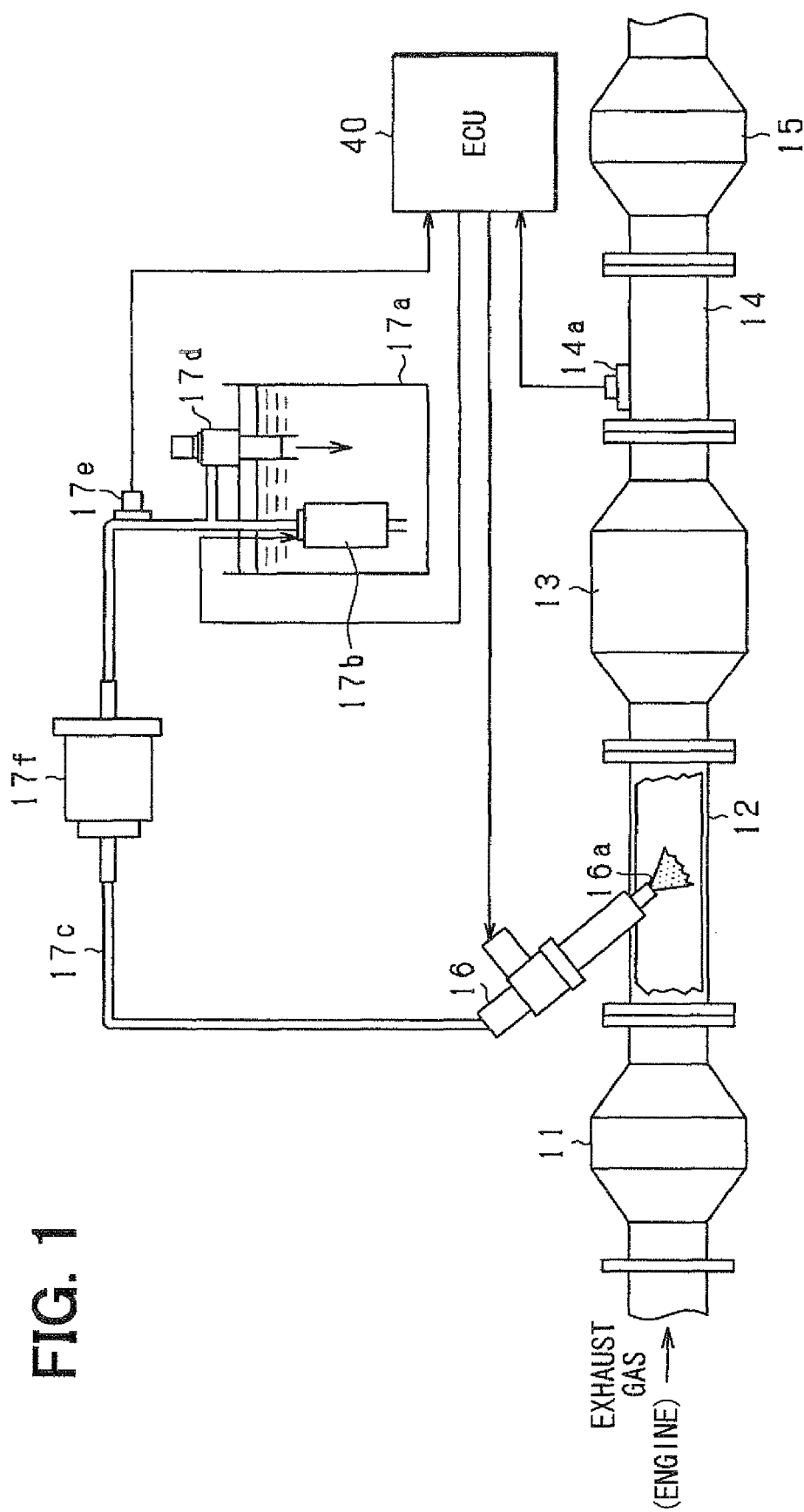
FIG. 1 is a schematic diagram showing an addition-amount controller for an exhaust gas purifying agent, and an exhaust emission control system with the addition-amount controller, according to one embodiment of the invention.

Referring to FIG. 1, the structure of the exhaust emission control system will be described in detail below. FIG. 1 is a diagram schematically showing the structure of a urea-SCR system (exhaust gas purification device) according to this embodiment.

As shown in FIG. 1, this system is adapted to purify exhaust gas emitted from a diesel engine (exhaust gas generating source) mounted on, for example, a four-wheeled vehicle (not shown). The system mainly includes various actuators and sensors for purifying the exhaust gas, and an ECU (electronic control unit) 40. The engine of this embodiment (engine of interest) is supposed to be a multi-cylinder engine (for example, inline four-cylinder engine) mounted on the four-wheeled vehicle (for example, an automatic car). Each cylinder is provided with an injector having a fuel injection valve. Fuel supplied to each cylinder by the injector burns off in the corresponding cylinder. The engine is the so-called four stroke (4×piston stroke) reciprocating diesel engine (internal combustion engine) which is designed to convert energy generated by combustion of the fuel into a rotational operation to rotate an output shaft (crankshaft). In other words, in this engine, the cylinder of interest at that time is sequentially determined by a cylinder determination sensor (electromagnetic pickup) provided in a cam shaft of an air intake and exhaust valve. One combustion cycle consisting of four strokes, namely, suction, compressions combustion, and exhaust, is performed in a cycle of "720° CA" at each of four cylinders #1 to #4. Specifically, for example, the respective combustion cycles for the four cylinders are sequentially executed at the cylinders #1, #3, #4, and #2 in that order by shifting the cycle between one cylinder and the next cylinder by "180° CA".

Specifically, various exhaust gas purification devices are disposed in the exhaust emission control system to form an exhaust gas purification system. The exhaust gas purification devices include a diesel particulate filter (DPF) 11, an exhaust gas pipe (exhaust gas passage) 12, a SCR catalyst 13, an exhaust gas pipe (exhaust gas passage) 14, and a $NH_3$ catalyst (for example, oxidation catalyst) 15 disposed from the upstream side of the exhaust gas (on the engine side which is an exhaust gas generating source) in that order. Onto a wall surface of the passage at a midway point of the exhaust gas pipe 12, a urea water addition valve 16 is disposed such that an injection port 16a opens toward the downstream side of the exhaust gas. Therefore, an injection port 16a is difficult to be dirty with the exhaust gas. The urea water addition valve 16 is adapted to add (inject and supply) the urea water pressure-fed into a urea water tank 17a to the downstream part with respect to the DPF 11. In this embodiment, the urea water addition valve 16 is a so-called electromagnetic driven injection valve whose driving is electrically controlled by the ECU 40. The addition valve 16 is controlled by the ECU 40 so that the urea water serving as an additive is injected and supplied by a desired addition amount to the exhaust gas flowing in the exhaust gas pipe 12 between the DPF 11 and the SCR catalyst 13. Thus, the urea water added (or $NH_3$ after decomposition) is supplied to the SCR catalyst 13 on the downstream side together with the exhaust gas using the flow of exhaust gas (exhaust gas flow).

That is, in this system, addition of the urea water through the urea water addition valve 16 generates the $NH_3$ (purifying agent) based on the urea water as indicated by the following decomposition reaction (formula 1) in the exhaust gas. The following $NO_x$ reduction reaction (as indicated by the following formula 2) is performed by use of $NH_3$ on the SCR catalyst 13, thereby purifying the exhaust gas (purifying $NO_x$) to be purified.

$$(NH_2)_2CO + H_2O \rightarrow 2NH_3 + CO_2 \quad \text{(Formula 1)}$$

$$NO + NO_2 + 2NH_3 \rightarrow 2N_2 + 3H_2O \quad \text{(Formula 2)}$$

The excessive $NH_3$ (surplus $NH_3$) not consumed in the above reduction reaction (indicated in the formula 2) and flowing into the downstream side of the SCR catalyst 13 (exhaust pipe 14) is purified through the reaction (indicated by the formula 3) by the $NH_3$ catalyst 15, and thereby the amount of $NH_3$ emitted into the atmosphere is decreased. The temperature of the exhaust gas on the downstream side of the SCR catalyst 13 and the amount of $NO_x$ (i.e., $NO_x$ emission amount) contained in the exhaust gas can be detected (specifically, can be calculated by the ECU 40 based on outputs from the sensors) by an exhaust gas sensor 14a (incorporating therein a $NO_x$ sensor and a temperature sensor) provided in the exhaust gas pipe 14.

$$4NH_3 + 3O_2 \rightarrow 2N_2 + 6H_2O \quad \text{(Formula 3)}$$

Next, each of the above-described exhaust gas purification devices constituting the exhaust gas purification system of the exhaust emission control system according to this embodiment will be described in detail below.

First, the DPF 11 is a continuously regenerated filter for particulate matter PM removal, that is, for collecting particulate matter (PM) in the exhaust gas. For example, the DPF 11 can be continuously used by repeatedly burning and removing (corresponding to a regeneration process) the collected PM in post injection or the like after main injection for mainly generating torque. The DPF 11 supports a platinum-based oxidation catalyst not shown (in this example, the DPF and the oxidation catalyst are integrally formed with each other, but may be formed separately). This can remove HC and CO together with soluble organic fraction (SOF), which is one of the PM components, and also oxidize a part of $NO_x$ (as the ratio of NO to $NO_2$ ("$NO:NO_2$") is closer to "1:1", the purification ratio of $NO_x$ becomes higher as indicated by the above reaction formula 2.

The SCR catalyst 13 is formed of catalytic metal, such as vanadium oxide ($V_2O_5$), supported on, for example, a honeycomb structural catalyst carrier. The SCR catalyst 13 has a catalytic action for promoting the reduction reaction (exhaust gas purification reaction) of $NO_x$, that is, the reaction indicated by the above formula 2).

The structure of the urea water addition valve 16 is based on that of a fuel injection valve (injector) commonly used in supply of fuel to an internal combustion engine for a vehicle. The structure of the urea water addition valve 16 is well known, and thus will be briefly described below. That is, for convenience of explanation, illustration of an inside structure of the addition valve 16 will be omitted. The urea water addition valve 16 incorporates in a valve body, a needle driving portion formed of an electromagnetic solenoid or the like, and a needle driven by the needle driving portion and reciprocating (moving vertically) in the valve body (housing). The needle is adapted to open and close a necessary number of injection holes formed in an injection port 16a at the tip of the valve body, or a circulation route to these injection holes. When the electromagnetic solenoid is energized, the urea water addition valve 16 with this arrangement (each element) moves in the direction of opening the valve by driving the needle by use of the electromagnetic solenoid according to an electric signal from the ECU 40 (for example, a pulse signal by PWM (Pulse Width Modulation) control), that is, according to an injection command from the ECU 40. Thus, the injection port 16a at the tip of the valve body is opened, specifically, at least one of the injection holes at the injection port 16a is opened, so that the urea water is added (injected) toward the exhaust gas flowing through the exhaust pipe 12. At this time, the amount of addition of the urea water (injection amount) is determined based on an energization time of the electromagnetic solenoid (for example, corresponding to a pulse width of a pulse signal by the ECU 40).

On the other hand, a urea water supply system for pressure-feeding the urea water to the urea water addition valve 16 mainly includes a urea water tank 17a, and a pump 17b. That is, the urea water stored in the urea water tank 17a is pumped by the pump 17b disposed in the tank 17a, and then pressure-fed toward the urea water addition valve 16. The pressure-fed urea water is sequentially supplied to the urea water addition valve 16 through a pipe 17c for supply of the urea water.

At this time, foreign matter contained in the urea water is removed by a barrier filter 17f provided on the upstream side with respect to the addition valve 16 before the urea water is supplied to the urea water addition valve 16. The pressure of supply of the urea water to the addition valve 16 is controlled by a urea water pressure regulator 17d. Specifically, when the supply pressure exceeds a predetermined value, a mechanical device using a spring or the like allows the urea water in the pipe 17c to return to the urea water tank 17a. In the present system, the supply pressure of the urea water is controlled to remain at the predetermined value (set pressure) based on the action of the regulator 17d. The supply pressure of the urea water is not controlled precisely to be kept at the set pressure even by the action of such a regulator 17d. In this system, the supply pressure of the urea water can be detected by the urea water pressure sensor 17e (specifically, calculated by the ECU 40 based on the sensor output) provided in a predetermined detection position. For example, the predetermined detection position is located on the downstream side of the regulator 17d, where a fuel pressure is stabilized through the pressure control by the regulator 17d.

A section for mainly performing control associated with the exhaust gas purification as an electronic control unit in such a system is the ECU 40 (for example, the ECU for control of the purification of exhaust gas connected to an ECU for control of the engine via a CAN or the like), that is, the addition-amount controller for an exhaust gas purifying agent according to this embodiment. The ECU 40 includes a well-known microcomputer (not shown), and operates various types of actuators, such as the urea water addition valve 16, based on detection signals from the various sensors to perform various types of control operations associated with the exhaust gas purification in the optimal form according to the condition of each time. The microcomputer installed on the ECU 40 basically includes a CPU (central processing unit) for performing various computations, a RAM (random access memory) serving as a main memory for temporarily storing therein data in the middle of the computation, the result of computation, or the like, and a ROM (read-only memory) serving as a program memory. The microcomputer also includes an EEPROM (electrically erasable and programmable read-only memory; electrically erasable programmable nonvolatile memory) serving as a memory for data storage, and a backup RAM (RAM fed by a backup power source, such as a vehicle-mounted battery). Further, the microcomputer includes signal processors, including an A/D converter and a clock generation circuit, various computation devices, such as an input/output port, for inputting and outputting signals with the external element, a storage device, a communication device, and a power supply circuit. The ROM previously stores therein various programs and a control map associated with the control of the exhaust gas purification, including a program associated with control of an addition amount of the exhaust gas purifying agent. The memory for storing data (for example, EEPROM) previously stores therein various kinds of control data or the like, including design data for the engine.

Figure 2:
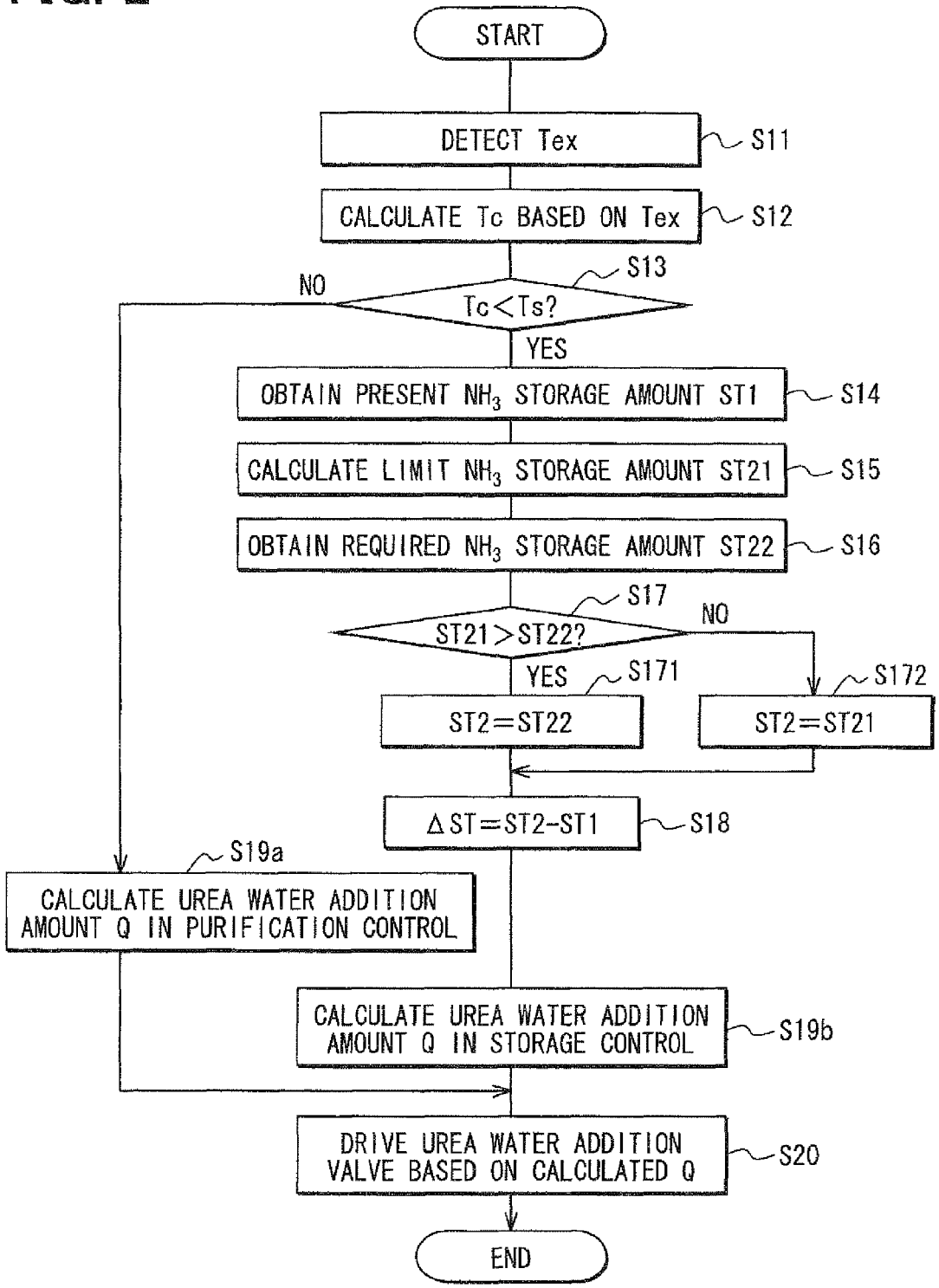
FIG. 2 is a flowchart showing control processing for controlling an amount of addition of urea water.

In the above description, the structure of the exhaust emission control system of this embodiment has been described in detail. That is, in this embodiment with this arrangement, $NH_3$ serving as the purifying agent is added to the exhaust gas in the form of urea aqueous solution (urea water) by the urea aqueous addition valve 16. Thus, the urea water is decomposed in the exhaust gas to form $NH_3$, and the $NO_x$ reduction reaction (indicated by the formula 2) is performed on the SCR catalyst 13 based on the thus-generated $NH_3$ to purify the exhaust gas (exhaust gas from the engine) to be purified. Furthermore, in this embodiment, the processing shown in FIG. 2 is carried out as the control of an addition amount of the urea water. This processing can obtain the high exhaust gas purification capacity in response to more conditions. The control of the addition amount of the urea water will be described with reference to FIGS. 2 to 5.

FIG. 2 is a flowchart showing the addition-amount control of the urea water. A series of control steps in the processing shown in FIG. 2 is basically performed repeatedly at intervals of a predetermined processing time while a predetermined condition is satisfied by executing the program stored in the ROM by means of the ECU 40, for example, during the time from the startup of the engine to the stopping of the engine. Values of various parameters used in the processing shown in FIG. 2 are stored in the storage device, such as the RAM or EEPROM mounted on the ECU 40, as occasion arises, and updated at any time if necessary.

As shown in FIG. 2, in control of the urea water addition amount, at step S11, the exhaust gas temperature Tex is detected, for example, is actually measured by the exhaust gas sensor 14a. At the subsequent step S12, the catalyst temperature Tc of the SCR catalyst 13 is calculated based on the detected exhaust gas temperature Tex. The catalyst temperature Tc is calculated using, for example, a predetermined map or a mathematical formula.

Then, at step S13, it is determined whether or not the catalyst temperature Tc calculated at step S12 is smaller than a predetermined determination value Ts (Tc<Ts). The determination value Ts is set, for example, as a value appropriate for the execution condition of the storage control, for example, derived by experiments or the like. In this embodiment, the addition-amount controller selects one of the purification control mode and the storage control mode to be carried out. In the purification control mode, the addition amount of the urea water by the urea water addition valve 16 is determined according to the predetermined parameter associated with the $NO_x$ amount in the exhaust gas, specifically, the rotation speed of the output shaft of the engine (engine rotation speed) and the fuel injection amount. In the storage control mode, the addition amount of the urea water by the urea water addition valve 16 is set to be larger than that in the purification control mode. For example, the addition amount of the urea water by the urea water addition valve 16 is set to be larger than that in the purification control mode only by increasing an amount required to cover a shortfall with respect to the target value of the $NH_3$ storage amount. That is, while one of the control modes is not performed, the other is performed. The selection of the control mode (switching between these control modes) is performed based on the result of determination at step S13.

More specifically, when the catalyst temperature Tc is determined not to be smaller than the determination value Ts at step S13, the storing of $NH_3$ is determined to be unnecessary, and thus the purification control mode is performed at S19a. Specifically, at step S19a, by the use of the predetermined reference map for calculation of the urea water addition amount or the mathematical formula, the urea water addition amount Q is obtained according to the engine rotation speed and the fuel injection amount. This reference map has compatible values (optimal values) of the urea water addition amount Q previously determined and written therein by experiments or the like according to respective optimal values of the engine rotational speed and the fuel injection amount. The map is stored, for example, in the ROM or the like in the ECU 40. This can obtain the high $NO_x$ purification ratio. At the subsequent step S20, the urea water addition valve 16 is driven and energized only for a time period according to the urea water addition amount Q.

In contrast, when the catalyst temperature Tc is determined to be smaller than the determination value Ts at step S13, the storage control mode is performed through the control processes in the following steps S14 to S20 so as to store $NH_3$ in the SCR catalyst 13.

Specifically, at step S14, first, a present $NH_3$ storage amount ST1 which is the $NH_3$ storage amount at that time of the SCR catalyst 13 is obtained. At this time, the present $NH_3$ storage amount ST1 is calculated by another routine. Specifically, an amount of increase or decrease in $NH_3$ storage amount $\Delta NH_3$ of the SCR catalyst 13 of each time is determined based on a difference between the $NH_3$ amount supplied to the SCR catalyst 13 and the amount of consumption of $NH_3$ on the SCR catalyst 13. And the occasional amounts of increase or decrease of the respective times are subsequently summed to be set as the above-described present $NH_3$ storage amount ST1 (ST1(present value)=$\Sigma$ST1(previous value)+$\Delta NH_3$). The above $NH_3$ amount supplied to the SCR catalyst 13 is calculated based on, for example, the addition amount of urea water by the urea water addition valve 16. In contrast, the consumption amount of $NH_3$ on the SCR catalyst 13 is calculated mainly based on the $NO_x$ amount emitted from the engine and the purification capacity of the catalyst 13. Among them, the $NO_x$ amount emitted from the engine can be calculated based on the predetermined parameter (for example, the engine rotation speed and the fuel injection amount) associated with the operating condition of the engine. On the other hand, the purification capacity of the SCR catalyst 13 (reaction rate of the $NH_3$) can be calculated, for example, using a control model of the SCR catalyst 13. The control model for use can be, for example, one or a combination of the following models: a property model showing a relationship between parameters as to a predetermined property; a transfer function showing a correspondence relationship between respective inputs and outputs regarding a level ratio, a frequency-amplitude ratio, a phase difference, a proportion element, a differential element, an integral element, and a delay element (=output signal/input signal); and a mathematical model in which a predetermined natural phenomenon is mathematically described.

Figure 3:
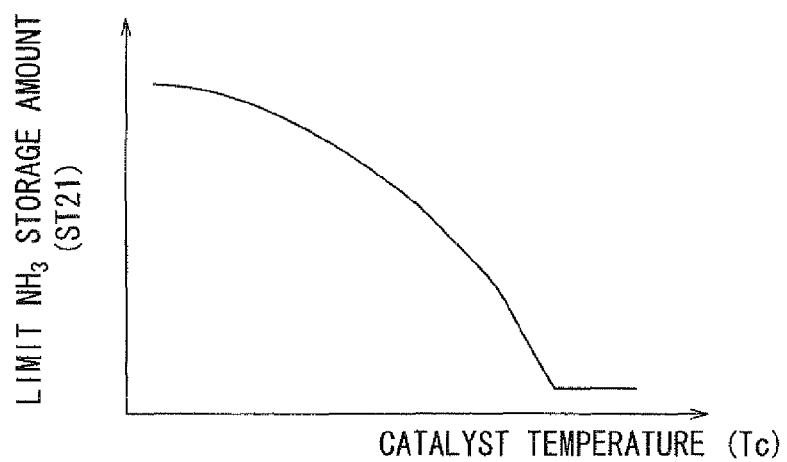
FIG. 3 is a graph showing an example of a map used for calculation of a limit $NH_3$ storage amount.

Then, at step S15, a limit $NH_3$ storage amount ST21 is calculated based on the catalyst temperature Tc calculated in the previous step S12. FIG. 3 shows an example of a map used for calculation of the limit $NH_3$ storage amount ST21. This map has suitable values (optimal values) previously written therein by experiments. As shown in FIG. 3, the limit $NH_3$ storage amount ST21 tends to decrease (a $NH_3$ storage capacity tends to decrease) with an increasing of the catalyst temperature Tc.

Figure 4:
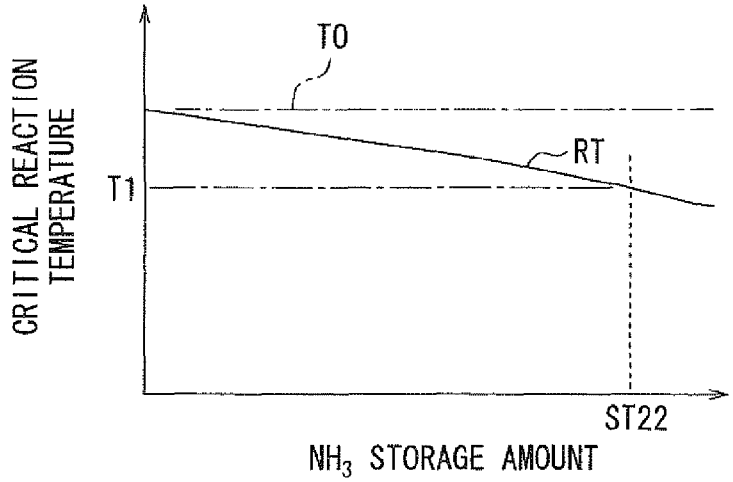
FIG. 4 is a graph showing an example of a relationship between the critical reaction temperature of a SCR catalyst and the $NH_3$ storage amount.
Figure 5:
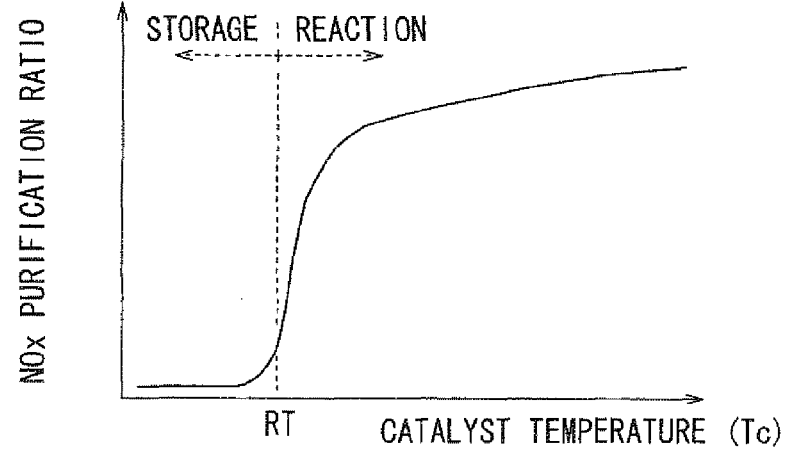
FIG. 5 is a graph showing an example of a purifying property of the SCR catalyst.

Then, at step S16, a necessary $NH_3$ storage amount (required $NH_3$ storage amount ST22, for example, a fixed value) is obtained so as to obtain a desired temperature as the critical reaction temperature (activation temperature) of the SCR catalyst 13. The required $NH_3$ storage amount ST22 is determined based on the relationship between the critical reaction temperature of the SCR catalyst 13 and the $NH_3$ storage amount as shown in FIG. 4 (one example provided by experiments or the like by the inventors). As indicated by the solid line RT in FIG. 4, the critical reaction temperature of the SCR catalyst 13 tends to decrease with increasing $NH_3$ storage amount. In the example indicated by the solid line RT, the desired temperature is supposed to be a critical reaction temperature T1 with respect to the critical reaction temperature T0 when $NH_3$ is not stored. For example, the critical reaction temperature T1 is a temperature lower than "140° C." which is the catalyst temperature supposed in idling, more specifically, for example, one temperature in a range of "50 to 120° C.". At this time, the critical reaction temperature (activation temperature) of the SCR catalyst 13 is an important parameter for determining the purification property of the SCR catalyst 13. FIG. 5 is a graph showing an example of the purification property of the SCR catalyst 13. As shown in FIG. 5, the $NO_x$ purification ratio of the SCR catalyst 13 largely changes at the boundary of the critical reaction temperature RT. That is, on the low temperature side with respect to the critical reaction temperature, the $NO_x$ purification ratio is set to substantially "0", and the $NH_3$ storage amount is larger than the $NH_3$ consumption amount consumed by the purification reaction with $NO_x$. In contrast, on the high temperature side with respect to the critical reaction temperature, the $NO_x$ purification ratio basically becomes larger as increasing catalyst temperature. In particular, the $NO_x$ purification ratio drastically changes at a temperature near the critical reaction temperature RT.

In the following step S17, by comparing the limit $NH_3$ storage amount ST21 obtained at step S15 with the required $NH_3$ storage amount ST22 obtained at step S16, it is determined whether or not the required $NH_3$ storage amount ST22 is smaller than the limit $NH_3$ storage amount ST21 (ST21>ST22). When the relation of ST21>ST22 is determined to be satisfied at step S17, then at the following step S171, the above required $NH_3$ storage amount ST22 is set as a target $NH_3$ storage amount ST2. On the other hand, when the relation of ST21>ST22 is determined not to be satisfied at step S17, then at step S172, the above limit $NH_3$ storage amount ST21 is set as the target $NH_3$ storage amount ST2.

Then, at step S18, a difference between the present $NH_3$ storage amount ST1 and the target $NH_3$ storage amount ST2 is calculated as a shortfall of the $NH_3$ storage amount $\Delta$ST (an amount of storage that is lacking as compared to the target $NH_3$ storage amount ST2) ($\Delta$ST=ST2−ST1).

Then, a urea water addition amount Q is obtained using the reference map for calculation of the predetermined urea water addition amount (the same one as that used at step S19a) and the $NH_3$ storage amount shortfall $\Delta$ST at step S19b. Specifically, the urea water addition amount Q in the storage control mode is a urea water addition amount increased so as to cover the $NH_3$ storage amount shortfall $\Delta$ST, as compared to the urea water addition amount in the purification control mode. In the following step S20, the urea water addition valve 16 is driven and energized only for a time corresponding to the urea water addition amount Q, based on the urea water addition amount Q thus obtained.

In this way, in this embodiment, the series of control steps in the control processing shown in FIG. 2 is repeatedly carried out, so that the $NH_3$ storage amount of the SCR catalyst 13 can be continuously maintained at a suitable amount, and the activation temperature of the catalyst 13 (critical reaction temperature) is controlled to an appropriate one. When ST21>ST22, the activation temperature of the catalyst 13 (critical reaction temperature) is controlled to the critical reaction temperature T1. Accordingly, even when the activation temperature of the catalyst 13 (critical reaction temperature) is low, for example, in a case where the engine starts to accelerate from the idling state described above, the higher exhaust gas purification capacity can be obtained.

As mentioned above, the addition-amount controller for an exhaust gas purifying agent and the exhaust emission control system according to this embodiment obtain the following excellent effects and advantages.

(1) The addition-amount controller is applied to the exhaust emission control system so as to control the amount of addition of the urea water by the urea water addition valve 16. The control system includes the SCR catalyst 13 having properties of storing $NH_3$ and further decreasing the critical reaction temperature (activation temperature) as the amount of $NH_3$ storage is increased (see FIG. 4). The SCR catalyst 13 is adapted to promote the specific exhaust gas purification reaction in the temperature range having the critical reaction temperature as the lower limit. In the control system, the urea water addition valve 16 is provided for adding the additive (urea water) serving as the $NH_3$ (ammonia) generating source to the exhaust gas on the upstream side with respect to the SCR catalyst 13. The additive is adapted to purify $NO_x$ (nitrogen oxides) in the exhaust gas by the above exhaust gas purification reaction on the catalyst 13. Such an addition-amount controller (ECU 40) for an exhaust gas purifying agent includes the program (storage amount detection means, corresponding to step S14 shown in FIG. 2) for detecting the present $NH_3$ storage amount, which is the $NH_3$ storage amount of the SCR catalyst 13 at a detection time. The controller also includes the program (storage amount changing means, corresponding to step S19b shown in FIG. 2) for changing the $NH_3$ storage amount of the SCR catalyst 13 by controlling the addition amount of the urea water by the urea water addition valve 16. The controller further includes the program (storage amount control means, corresponding to step S20 shown in FIG. 2) for controlling the $NH_3$ storage amount of the SCR catalyst 13 to the target $NH_3$ storage amount as a target value, by changing the $NH_3$ storage amount at step S19b based on the present $NH_3$ storage amount ST1 detected at step S14. This can further decrease the activation temperature (critical reaction temperature) even when the catalyst is at a low temperature, for example, in a case where the engine starts to accelerate from the above-described idling state, thereby obtaining the higher exhaust gas purification capacity.

(2) In the storage control mode, at step S20 shown in FIG. 2, the $NH_3$ storage amount of the SCR catalyst 13 is controlled to be the target $NH_3$ storage amount ST2 by compensating for the shortfall of the $NH_3$ storage amount corresponding to a difference between the target $NH_3$ storage amount ST2 and the present $NH_3$ storage amount ST1 (i.e., $NH_3$ storage amount shortfall $\Delta ST$) by the process at step S19b. Thus, in the storage control mode, the shortfall of the $NH_3$ storage amount ($NH_3$ storage amount shortfall $\Delta ST$) is compensated, so that the $NH_3$ storage amount of the SCR catalyst 13 can be set to the target $NH_3$ storage amount.

(3) In step S20 shown in FIG. 2, while the predetermined condition (the condition at step S13 of "Tc<Ts") is satisfied, the control of the $NH_3$ storage amount (the processing in steps S14 to S20) described above is repeatedly performed. Accordingly, the $NH_3$ storage amount of the SCR catalyst 13 can be continuously controlled to the appropriate amount with high accuracy. Thus, the activation temperature of the catalyst 13 (critical reaction temperature) can be suitably controlled to the appropriate temperature.

(4) The addition-amount controller also includes the program (mode selection means, corresponding to step S13 shown in FIG. 2) for selecting one mode to be executed at that time based on the execution condition for each mode, from among the plurality of control modes, including the purification control mode and the storage control mode. In the purification control mode (processes at steps S19a and S20 shown in FIG. 2), the addition amount of the urea water by the urea water addition valve 16 is determined according to the predetermined parameter associated with the $NO_x$ amount of the exhaust gas. In the storage control mode (processes in steps S14 to S20 shown in FIG. 2), the addition amount of the urea water by the urea water addition valve 16 is set to be larger than that in the purification control mode. When the storage control mode is selected by the process at step S13, that is, when Tc<Ts, the control of the $NH_3$ storage amount associated with the processes in the above steps S14 to S20 is executed at step S20 shown in FIG. 2. Thus, the execution condition is previously set appropriately at step S13 in this embodiment, so that the above storage control mode can be executed at more preferable timing. This can reduce the decrease in $NO_x$ purification ratio caused by the $NH_3$ storage.

(5) The addition-amount controller includes the program (catalyst temperature determination means, corresponding to step S13 in FIG. 2) for determining whether or not the temperature of the SCR catalyst 13 at that time is lower than the allowable level by comparison with a predetermined threshold. A satisfaction requirement of the execution condition of the storage control mode includes the determination at step S13 that the temperature of the SCR catalyst 13 is lower than the allowable level. Accordingly, it is possible to store the $NH_3$ in the more demanding condition, for example, in a case where the temperature of the SCR catalyst 13 is lower than a predetermined temperature (allowable level).

(6) At step S14 shown in FIG. 2, the amount $\Delta NH_3$ of increase or decrease in $NH_3$ storage amount of the SCR catalyst 13 of each time is determined based on the difference between the $NH_3$ amount supplied to the SCR catalyst 13 and the $NH_3$ consumption amount on the catalyst 13. Further, the increase or decrease amounts of the respective times are subsequently summed (ST1(value at the present time)=$\Sigma$ST1 (previous value)+$\Delta NH_3$), thereby detecting the present $NH_3$ storage amount ST1 described above. Accordingly, it is possible to accurately calculate the amount $\Delta NH_3$ of increase or decrease in $NH_3$ storage amount of each time and the present $NH_3$ amount ST1 by determination that the remaining $NH_3$ is stored on the SCR catalyst 13 based on the revenue and expenditure of the $NH_3$ amount.

(7) At step S14 shown in FIG. 2, the amount of consumption of $NH_3$ on the SCR catalyst 13 is determined based on a predetermined parameter associated with the operating condition of the engine (for example, the engine rotation speed and the fuel injection amount). Accordingly, the $NO_x$ amount emitted from the engine, and further the $NH_3$ consumption amount on the SCR catalyst 13 can be detected more easily and accurately.

(8) The addition-amount controller also includes a program (limit storage amount detection means, corresponding to step S15 shown in FIG. 2) for detecting the limit storage amount of $NH_3$ that can be stored in the SCR catalyst 13 at that time (limit $NH_3$ storage amount ST21). The addition-amount controller further includes a control program (steps S17, S171, and S172 shown in FIG. 2) for setting a variable range of the target $NH_3$ storage amount ST2 by using the limit $NH_3$ storage amount ST21. The limit $NH_3$ storage amount ST21 is detected by the process at step S15 and is set as the upper limit value (guard value). Thus, it is possible to set the limit $NH_3$ storage amount ST21 as the upper limit, so as to prevent (or suppress) the supply of the excess $NH_3$.

(9) At step S15 shown in FIG. 2, the limit $NH_3$ storage amount ST21 is detected based on the exhaust gas temperature on the downstream side with respect to the catalyst 13, which corresponds to the temperature of the SCR catalyst 13. Thus, it can detect (estimate) the temperature of the SCR catalyst 13 with high accuracy.

(10) A temperature lower than the catalyst temperature of "140° C." supposed in idling, and an $NH_3$ storage amount corresponding to the temperature are set as the critical reaction temperature T1, and further as the required $NH_3$ storage amount ST22 (see FIG. 4 for both), respectively. This can surely purify the exhaust gas even when starting to accelerate from the idling state.

(11) The urea water addition valve 16 is configured to inject and add the urea aqueous solution as the additive for acting as the $NH_3$ generating source, to the exhaust gas on the upstream side (exhaust pipe 12) with respect to the SCR catalyst 13 (that is, to achieve the so-called urea SCR system). Thus, the urea aqueous solution is injected and added to the exhaust gas on the upstream side with respect to the SCR catalyst 13. Therefore, until the urea water reaches the catalyst 13, the urea is hydrolyzed by exhaust gas heat or the like to form $NH_3$. This can supply more $NH_3$ (purifying agent) to the SCR catalyst 13.

(12) The above urea SCR system is installed on the vehicle equipped with the diesel engine (four-wheeled vehicle in this embodiment). This can improve the fuel efficiency and decrease the PM by allowing the generation of $NO_x$ during the combustion process. This can achieve the cleaner diesel vehicle having the high exhaust gas purification capacity.

(13) In contrast, the exhaust emission control system includes the SCR catalyst 13 and the urea water addition valve 16 together with each program (ECU 40), and a urea water supply device (e.g., the urea water tank 17a, the pump 17b, and the like) for supplying the urea aqueous solution to the addition valve 16. The exhaust emission control system with this arrangement achieves the exhaust gas purification system having the higher exhaust gas purification capacity.

The above-described embodiment may be changed in the following way.

According to the applications of the exhaust emission control system, the control process at step S15, S17, S171, or S172 shown in FIG. 2 may be omitted. In this case, at step S18, the required $NH_3$ storage amount ST22 can be effectively set to the target $NH_3$ storage amount ST2 as it is.

Although in the above-described embodiment, two control modes of the purification control mode and the storage control mode are switched, the invention is not limited thereto. Adding another control mode to these control modes enables selection of one to be executed at that time from among three or more types of control modes based on satisfaction of the execution condition of each mode.

Figure 6:
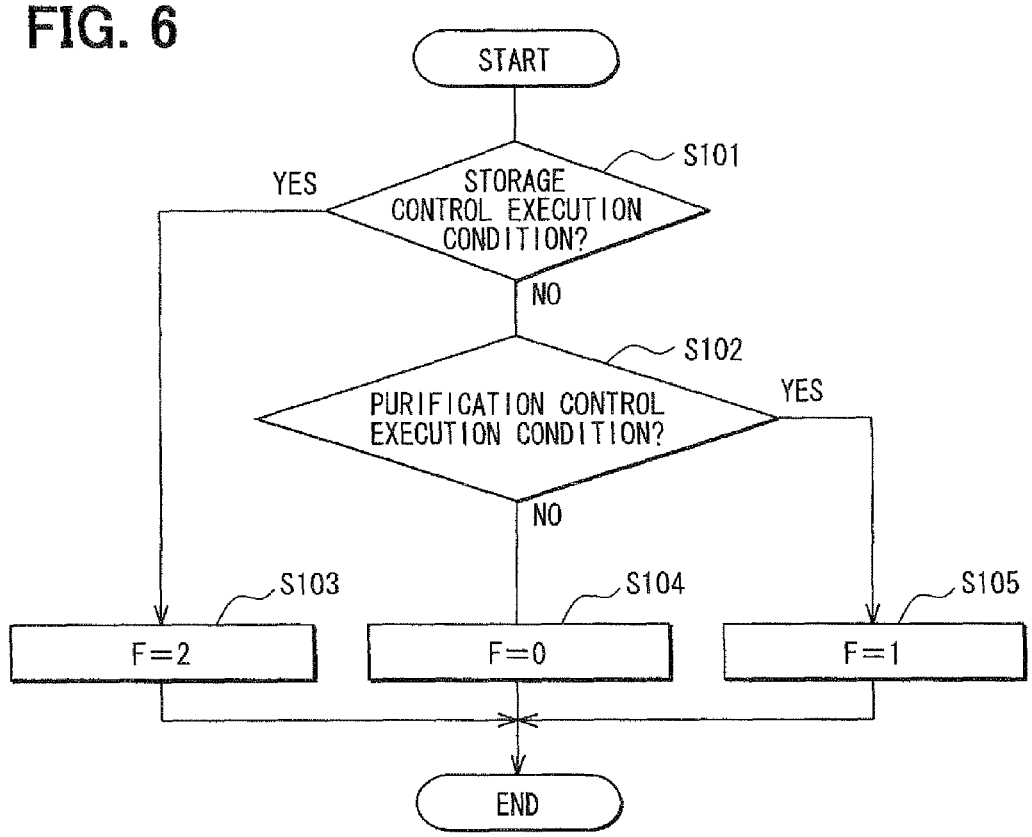
FIG. 6 is a flowchart showing another example of control processing regarding mode selection.

For example, mode selection may be performed through the processing exemplified as shown in the flowchart of FIG. 6. In this example, the use of a value of a urea water addition control flag F ("0 to 2") selects one of three types of the purification control mode, the storage control mode, and the urea water non-addition mode.

As shown in FIG. 6, in this example, it is determined whether or not a predetermined execution condition associated with the storage control mode (storage control execution condition) is satisfied at step S101. When the storage control execution condition is determined to be satisfied at step S101, the urea water addition control flag F is set to "2" at the subsequent step S103.

In contrast, when the storage control execution condition is determined not to be satisfied at step S101, it is determined whether or not a predetermined execution condition associated with the purification control mode (purification control execution condition) is satisfied in the subsequent step S102. When the purification control execution condition is determined to be satisfied at step S102, the urea water addition control flag F is set to "1" at the subsequent step S105. On the other hand, when the purification control execution condition is determined not to be satisfied at step S102, the urea water addition control flag F is set to "0" at the subsequent step S104.

This can select one to be executed at that time among the three or more types of control modes.

Figure 7:
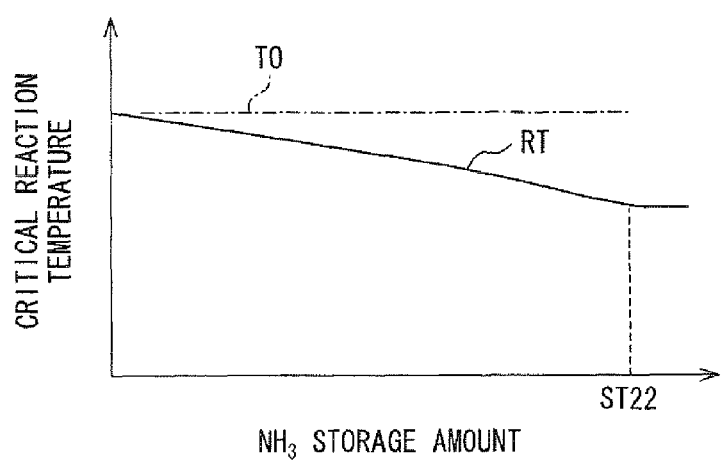
FIG. 7 is a graph showing a modification example showing a setting state of a required $NH_3$ storage amount.

Although in the above-described embodiment, the $NH_3$ storage amount is set corresponding to the predetermined critical reaction temperature T1 lower than the catalyst temperature of "140° C." supposed in idling, as the required $NH_3$ storage amount ST22 for use in determination of the target $NH_3$ storage amount ST2, the invention is not limited thereto. For example, as shown in FIG. 7, the required $NH_3$ storage amount ST22 can be effectively set to a boundary value at which the critical reaction temperature is not decreased even by increasing the $NH_3$ storage amount of the SCR catalyst 13. Accordingly, it is possible to suitably prevent (or suppress) the excess storage of $NH_3$ not contributing to the critical reaction temperature. In FIG. 7, RT indicates the critical reaction temperature when $NH_3$ is stored, and T0 indicates the critical reaction temperature when $NH_3$ is not stored.

In the above-described embodiment, the required $NH_3$ storage amount ST22 is set as the fixed value, but the invention is not limited thereto. The required $NH_3$ storage amount ST22 may be variably set according to the condition of each time. For example, the storage amount may be set to differ between at the startup time of the engine and the idling time. Alternatively, the required $NH_3$ storage amount ST22 may be variably set according to a target value of the critical reaction temperature or a target value of the $NO_x$ purification ratio on the SCR catalyst 13.

In the above-described embodiment, the catalyst temperature Tc is determined based on the exhaust gas temperature. However, the temperature of the catalyst itself is not determined, and the exhaust gas temperature may be used as a substitute for the catalyst temperature.

In the above-described embodiment, at step S13 shown in FIG. 2, it is determined whether or not the temperature of the SCR catalyst 13 is lower than the allowable level by comparison with a predetermined threshold, but the invention is not limited thereto. For example, it may be determined whether or not the present $NH_3$ storage amount ST1 is larger than the allowable level by comparison with a predetermined threshold at step S13. Alternatively, it may be determined whether or not there is a sufficient room (allowable range) between the present $NH_3$ storage amount ST1 and the limit $NH_3$ storage amount ST21. For example, it may be determined whether or not there is a large room as compared with the allowable level, by comparison with the corresponding predetermined threshold. Any one of both determination means described above may be effectively used. Alternatively, any combination of the above respective determination means, including the catalyst temperature, may be effectively used.

In short, the addition-amount controller includes the program (storage amount determination means) for determining whether or not the $NH_3$ storage amount of the SCR catalyst 13 at that time is larger than the allowable level (e.g., a predetermined amount). The satisfaction requirement of the execution condition of the storage control mode may include the determination that the $NH_3$ storage amount of the SCR catalyst 13 is not larger than the allowable level. Alternatively, the addition-amount controller may include the program (limit storage determination means) for determining whether or not $NH_3$ can be stored on the SCR catalyst 13 at that time. The satisfaction requirement of the execution condition of the storage control mode may include the determination that the $NH_3$ can be stored. Any one or both of these programs can be used to more suitably perform the storage of $NH_3$ as described above.

The $NO_x$ amount in the exhaust gas can be determined not only by estimation from the engine operating state, but also, for example, by the actually measured value (sensor output) by an $NO_x$ sensor or the like. Furthermore, for example, the $NO_x$ amount in the exhaust gas can be estimated based on the state of the exhaust gas (e.g., exhaust gas temperature detected by the exhaust gas temperature sensor or the like) or components (for example, an oxygen concentration detected by an oxygen concentration sensor or the like).

The kind of the exhaust gas generating source to be purified or the system structure can be arbitrarily changed according to the used conditions or the like.

For example, when the exhaust gas from the engine for a vehicle is an object to be purified, the invention can be applied not only to a compression ignition diesel engine, but also a spark ignition gasoline engine or the like. Since the compression ignition engine, such as the diesel engine, has the low exhaust gas temperature as compared to that in the spark ignition engine, the invention is effectively applied to the compression ignition engine, thereby enhancing the purification capacity when the catalyst temperature is low. The invention can also be applied to a rotary engine or the like other than a reciprocating engine. Furthermore, the invention can also be applied to purification of exhaust gas from sources other than the vehicle, that is, for example, purification of exhaust gas from an electric power plant, various factories, or the like.

On the other hand, the system structure may be changed in the following way. For example, as shown in FIG. 1, the additive (urea water) is added to the exhaust gas on the upstream side with respect to the catalyst 13 to deliver the additive to the catalyst 13 by the exhaust gas flow, but the invention is not limited thereto. Alternatively, the additive may be directly added (for example, injected) to the catalyst itself. For example, when the amount of emission of $NH_3$ is sufficiently decreased in the structure shown in FIG. 1, the $NH_3$ catalyst 15 can be omitted from the structure.

When various modifications are made to the structures in the above embodiments, the details of various processes (programs) described above are preferably changed to the respective optimal forms according to the actual structure if necessary.

Actually, the main demand for the invention comes from the urea-SCR (selective reduction) system. The invention, however, can also be used for other applications as long as the exhaust gas is purified on a catalyst using the same purifying agent ($NH_3$) for purifying the same specific component of interest.

In the above-described and modified examples, various types of software (programs) are supposed to be used, but hardware, such as a dedicated circuit, may be used to achieve the same function.

Such changes and modifications are to be understood as being within the scope of the present invention as defined by the appended claims.

What is claimed is:

1. An addition-amount controller for an exhaust gas purifying agent, the controller for use with an exhaust emission control system including a catalyst for promoting a specific exhaust gas purification reaction in a temperature range having a critical reaction temperature as a lower limit, and an addition valve for adding an additive of $NH_3$ or an additive serving as a generating source of the $NH_3$ to the catalyst itself or the exhaust gas on an upstream side with respect to the catalyst, the additive being adapted to purify $NO_x$ in exhaust gas by the exhaust gas purification reaction on the catalyst, the addition-amount controller being adapted to control an amount of addition by the addition valve, the catalyst having properties of storing $NH_3$ and further decreasing the critical reaction temperature as the amount of $NH_3$ storage is increased, the addition-amount controller comprising:

an electronic control unit including instructions which when implemented by the electronic control unit provides at least functionality comprising:

obtaining a present $NH_3$ storage amount that is a storage amount of $NH_3$ of the catalyst at a detection time;

changing the $NH_3$ storage amount of the catalyst by controlling the addition amount by the addition valve;

controlling the $NH_3$ storage amount of the catalyst to a target $NH_3$ storage amount, based on the obtained present $NH_3$ storage amount;

detecting a limit $NH_3$ storage amount that is able to be stored in the catalyst, based on the temperature of the catalyst or a value equivalent to the temperature of the catalyst;

setting a variable range of the target $NH_3$ storage amount using the detected limit $NH_3$ storage amount as an upper limit; and selecting one mode to be executed based on satisfaction of an execution condition for each mode, from among a plurality of control modes, the control modes including a purification control mode in which the addition amount by the addition valve is determined according to a predetermined parameter associated with an amount of $NO_x$ in the exhaust gas, and a storage control mode in which the addition amount by the addition valve is set to be larger than that in the purification control mode;

executing the control of the addition amount by the addition valve based on a difference between the present $NH_3$ storage amount and the target $NH_3$ storage amount when the storage control mode is selected;

executing the control of the addition amount by the addition valve based on the predetermined parameter associated with the amount of $NO_x$ in the exhaust gas, without using the present $NH_3$ storage amount and the target $NH_3$ storage amount, when the purification control mode is selected;

the target $NH_3$ storage amount being variable in the set variable range with the limit $NH_3$ storage amount as the upper limit;

determining a required $NH_3$ storage amount based on the critical reaction temperature;

comparing the limit $NH_3$ storage amount with the required $NH_3$ storage amount determined based on the critical reaction temperature; and setting the target $NH_3$ storage amount based on the comparison including setting the required $NH_3$ storage amount as the target $NH_3$ storage amount if the required $NH_3$ storage amount is smaller than the limit $NH_3$ storage amount in said comparing, and setting the limit $NH_3$ storage amount as the target $NH_3$ storage amount if the required $NH_3$ storage amount is not smaller than the limit $NH_3$ storage amount in the comparison.

2. The addition-amount controller for an exhaust gas purifying agent according to claim 1, wherein detecting the limit $NH_3$ storage amount as the value equivalent to the temperature of the catalyst is based on a temperature of exhaust gas on a downstream side with respect to the catalyst.

3. The addition-amount controller for an exhaust gas purifying agent according to claim 1, wherein controlling the $NH_3$ storage amount of the catalyst to the target $NH_3$ storage amount is performed by covering a shortfall of the $NH_3$ storage amount corresponding to a difference between the target $NH_3$ storage amount and the present $NH_3$ storage amount.

4. The addition-amount controller for an exhaust gas purifying agent according to claim 1, wherein controlling the storage amount control comprises repeatedly executing the control of the $NH_3$ storage amount while a predetermined condition is satisfied.

5. The addition-amount controller for an exhaust gas purifying agent according to claim 1, wherein the functionality further comprises determining whether the $NH_3$ storage amount of the catalyst is larger than a predetermined amount,
wherein a satisfaction requirement of an execution condition of the storage control mode includes a determination that the $NH_3$ storage amount of the catalyst is not larger than the predetermined amount.

6. The addition-amount controller for an exhaust gas purifying agent according to claim 1, wherein the functionality further comprises determining whether $NH_3$ is able to be stored in the catalyst,
wherein a satisfaction requirement of an execution condition of the storage control mode includes a determination that $NH_3$ is able to be stored.

7. The addition-amount controller for an exhaust gas purifying agent according to claim 1, wherein the functionality further comprises determining whether the temperature of the catalyst is lower than a predetermined temperature,
wherein a satisfaction requirement of the execution condition of the storage control mode includes a determination that the temperature of the catalyst is lower than the predetermined temperature.

8. The addition-amount controller for an exhaust gas purifying agent according to claim 1, wherein the exhaust emission control system is adapted to purify the exhaust gas emitted from an internal combustion engine, and
wherein obtaining the storage amount of $NH_3$ includes determining an amount of increase or decrease in the $NH_3$ storage amount of the catalyst of each time based on a difference between the $NH_3$ amount supplied to the catalyst and an amount of consumption of $NH_3$ on the catalyst, while subsequently summing the amounts of increase or decrease of the respective times, so as to detect the present $NH_3$ storage amount.

9. The addition-amount controller for an exhaust gas purifying agent according to claim 8, wherein the functionality further comprises determining the amount of consumption of $NH_3$ on the catalyst based on a predetermined parameter associated with an operating condition of the internal combustion engine.

10. An exhaust emission control system comprising:
the addition-amount controller as in claim 8;
the catalyst and the addition valve; and
a urea water supply device for supplying the urea aqueous solution to the addition valve.

11. The addition-amount controller for an exhaust gas purifying agent according to claim 1, wherein the functionality further comprises determining the target $NH_3$ storage amount based on a boundary value at which the critical reaction temperature is not decreased even by increasing the $NH_3$ storage amount of the catalyst.

12. The addition-amount controller for an exhaust gas purifying agent according to claim 1, wherein the addition valve is adapted to inject and add a urea aqueous solution as the additive to the exhaust gas on an upstream side with respect to the catalyst.

13. The addition-amount controller for an exhaust gas purifying agent according to claim 1, wherein the target $NH_3$ storage amount is variable in the variable range that is changed in accordance with a temperature of the catalyst.

14. A method of controlling an addition-amount controller for an exhaust gas purifying agent for use with an exhaust emission control system including a catalyst for promoting a specific exhaust gas purification reaction in a temperature range having a critical reaction temperature as a lower limit, and an addition valve for adding an additive of $NH_3$ or an additive serving as a generating source of the $NH_3$ to the catalyst itself or the exhaust gas on an upstream side with respect to the catalyst, the additive being adapted to purify $NO_x$ in exhaust gas by the exhaust gas purification reaction on the catalyst, the addition-amount controller being adapted to control an amount of addition by the addition valve, the catalyst having properties of storing $NH_3$ and further decreasing the critical reaction temperature as the amount of $NH_3$ storage is increased, the method comprising:
obtaining a present $NH_3$ storage amount that is a storage amount of $NH_3$ of the catalyst at a detection time;
changing the $NH_3$ storage amount of the catalyst by controlling the addition amount by the addition valve;
controlling the $NH_3$ storage amount of the catalyst to a target $NH_3$ storage amount, based on the obtained present $NH_3$ storage amount;
detecting a limit $NH_3$ storage amount that is able to be stored in the catalyst, based on the temperature of the catalyst or a value equivalent to the temperature of the catalyst;
setting a variable range of the target $NH_3$ storage amount using the detected limit $NH_3$ storage amount as an upper limit;
selecting, using a computer processor, one mode to be executed based on satisfaction of an execution condition for each mode, from among a plurality of control modes, the control modes including a purification control mode in which the addition amount by the addition valve is determined according to a predetermined parameter associated with an amount of $NO_x$ in the exhaust gas, and a storage control mode in which the addition amount by the addition valve is set to be larger than that in the purification control mode;
executing control of the addition amount by the addition valve, based on a difference between the present $NH_3$ storage amount and the target $NH_3$ storage amount when the storage control mode is selected;
executing control of the addition amount by the addition valve, based on the predetermined parameter associated with the amount of $NO_x$ in the exhaust gas, without using the present $NH_3$ storage amount and the target $NH_3$ storage amount, when the purification control mode is selected;
determining a required $NH_3$ storage amount based on the critical reaction temperature;
comparing the limit $NH_3$ storage amount with the required $NH_3$ storage amount which is determined based on the critical reaction temperature; and
setting the target $NH_3$ storage amount based on said comparing;

wherein the target $NH_3$ storage amount is variable in the set variable range with the limit $NH_3$ storage amount as the upper limit; and wherein the required $NH_3$ storage amount is set as the target $NH_3$ storage amount if the required $NH_3$ storage amount is smaller than the limit $NH_3$ storage amount in said comparing, and wherein the limit $NH_3$ storage amount is set as the target $NH_3$ storage amount if the required $NH_3$ storage amount is not smaller than the limit $NH_3$ storage amount in the comparing.

* * * * *